United States Patent [19]

Iwai et al.

[11] Patent Number: 5,528,681
[45] Date of Patent: Jun. 18, 1996

[54] AUTOMATIC DIALING DEVICE AND AUXILIARY DIALING DEVICE FOR A TELEPHONE

[76] Inventors: Seizo Iwai; Tsuneko Iwai; Yukiko Iwai, all of 1549 Souja, Souja-Machi, Maebashi-Shi, Gunma-Ken; Yumiko Kato, 301, Shimonagaya-Kita Park Homes, 4-3-70, Shimonagaya, Konan-Ku, Yokohoma-Shi, Kanagawa-Ken, all of Japan

[21] Appl. No.: 371,224

[22] Filed: Jan. 11, 1995

[30] Foreign Application Priority Data

Jan. 12, 1994 [JP] Japan ................... 6-001705

[51] Int. Cl.⁶ .................. H04M 11/00; H04M 1/00
[52] U.S. Cl. ................. 379/355; 379/354; 379/356; 379/93
[58] Field of Search ............ 379/93, 94, 96–100, 379/355, 356, 357, 354

[56] References Cited

U.S. PATENT DOCUMENTS

| | | | |
|---|---|---|---|
| 5,099,507 | 3/1992 | Mukai et al. | 379/355 |
| 5,101,427 | 3/1992 | Kotani et al. | 379/355 |
| 5,280,516 | 1/1994 | Jang | 379/355 |

*Primary Examiner*—Jason Chan
*Attorney, Agent, or Firm*—Michael N. Meller

[57] ABSTRACT

An automatic dialing device is provided, which receives the telephone number of a party to be called by forwarding a call and which performs dialing automatically. The automatic dialing device has a connection detection circuit which detects the connect condition of a telephone, a storage command forming circuit which forms a number storage command when the telephone number of a party to be called is sent when the connection detection circuit detects the connect condition, a number storage circuit which stores the telephone number sent together with a transmission instruction signal When the number storage command is issued from the storage command forming circuit, a calling command circuit which, after detection of the connect condition by the connection detection circuit, causes the telephone to call the number stored in the number storage circuit at least one time, and an erasure circuit which erases the contents of the memory of the number storage circuit after the connection condition is established by the calling operation performed by the calling command circuit.

4 Claims, 4 Drawing Sheets

AUTOMATIC DIALING DEVICE AND AUXILIARY DIALING DEVICE FOR A TELEPHONE

DETAILED DESCRIPTION OF THE INVENTION

1. Field of Utilization in Industry

This invention relates to a dialing device for a telephone, and more particularly to an automatic dialing device and auxiliary dialing device which perform a calling operation, using the telephone number data for the party to be called, without performing a manual dialing operation.

2. Prior Art

When a person calls his or her employer from, for example, a portable telephone of the type that has become popular in recent years, it can happen that the person is told that a there had been a telephone call received, and that it is necessary to make a telephone call immediately. When such a call is received, the telephone number is either recorded in a note or remembered, and used in making the telephone call.

3. Problem to be Solved by the Invention

In such cases, when making a note of or remembering the telephone number, it is easy to hear the telephone number incorrectly, and even if it is heard correctly, this requires attention. It is particularly easy to make a mistake when the surrounding area is noisy, and if the number was memorized, it is easy to make a mistake when recalling the number.

Of the portable phones in use, when using a mobile telephone, which has gained in popularity in recent years, it is difficult to make a note of the telephone number, and the situation makes memorization difficult as well.

SUMMARY OF THE INVENTION

The present invention was made in consideration of the above-described situation, and has as an object the provision of an automatic dialing device and auxiliary dialing device for a call-forwarding type telephone which receives a call and makes a call automatically.

Means for Solving the Problems

To achieve the above-noted object, the present invention provides, according to claim 1, an automatic dialing device for a telephone, this automatic dialing device having a connection detection means which detects when the telephone is in the connect condition, a storage command forming means which forms the telephone number storage command for the received telephone number of the party to be called when the connection detection means detects the connect condition, a number storage means which stores the telephone number which is received along with a transmission instruction signal when a number storage command is given from the storage command forming means, a calling command means which, after the connection detection means detects the end of telephone connection, performs a calling operation at least one time using the telephone number stored in the number storage means, and a erasure means which erases the contents of memory in the number storage means after the connect condition occurs by means of a calling operation by the calling command means.

To achieve the above-noted object, the present invention according to claim 2 provides a automatic dialing device for a telephone of claim 1, but wherein the number storage means stores and reads out a number of telephone numbers consecutively.

To achieve the above-noted object, the present invention according to claim 3 provides an automatic dialing device of claim 1, but wherein the number storage means reads out number data in response to a manual operating input, this number data causing a sound to be emanated from the handset of the telephone.

To achieve the above-noted object, the present invention according to claim 4 provides an automatic dialing device of claim 1, but which additionally has an audio circuit which forms an audible signal, this audio circuit forming the voice signal in response to a storage completion signal generated at the completion of the storage by the number storage means of the number of the remote party to be called, and being transmitted to the remote party via the telephone.

To achieve the above-noted object, the present invention according to claim 5 provides an auxiliary dialing device which performs a dialing operation in a telephone by injecting a signal tone via the mouthpiece of the telephone, this automatic dialing device having a receiving means which receives a ring tone and outputs this as telephone number data, a storage means which stores the telephone number data received by the receiving means, a display means which visibly displays the telephone number based on the telephone number stored in the storage means, and an audio signal generation means which reproduces the telephone number stored in the storage means as a signal tones in response to operation, so that the signal tones reproduced by the audio signal generation means are input via the mouthpiece of the telephone.

To achieve the above-noted object, the present invention according to claim 6 provides the auxiliary dialing device of claim 5, wherein the storage means is capable of repeatedly reading out in response to a reading operation the stored telephone number data, and also capable of erasing the telephone number data in response to an erase operation.

Mode of Operation

According to the present configuration of claim 1, if the telephone connection is detected by the connection detection means, the transmission instruction signal is sent together with the telephone number of the party to be called, and the telephone number is stored in the number storage means. After the connection detection means detects the termination of the telephone connection, the telephone number which had been stored in the above-noted storage means is used to perform at least one calling operation from the telephone. If this results in a telephone connection, the number that had been stored in the number storage means is erased, and the condition of waiting for the next such storage of a telephone number is enabled. After calling a prescribed number of times, the telephone number is held in the number storage means for use in a calling operation.

According to the configuration of claim 2, it is possible for the number storage means to consecutively store a plurality of telephone numbers, and to perform the operation of reading these out consecutively.

According to the configuration of claim 3, in response to an operation input, number data is output, this number data being used to generate a sound from the handset of the telephone, providing a verification of the data by means of the type of sound.

According to the configuration of claim 4, when the storage of the telephone number that is to be called is completed, in response to a storage completion signal from the number storage means an audio circuit sends an audible signal via the telephone to the remote party to which connection made to provide a verification of completion of the storage.

According to the configuration of claim 5, telephone number data sent as a radio signal is displayed by a pocket radio pager, and a readout operation causes the formation of signal tones in response to the telephone number data. These signal tones are sent via the mouthpiece of the telephone to perform a dialing operation from the telephone.

According to the configuration of claim 6, until an erase operation is performed, signal tones are formed in response to the telephone number data until an erase operation is performed.

PREFERRED EMBODIMENTS

Figure 1:
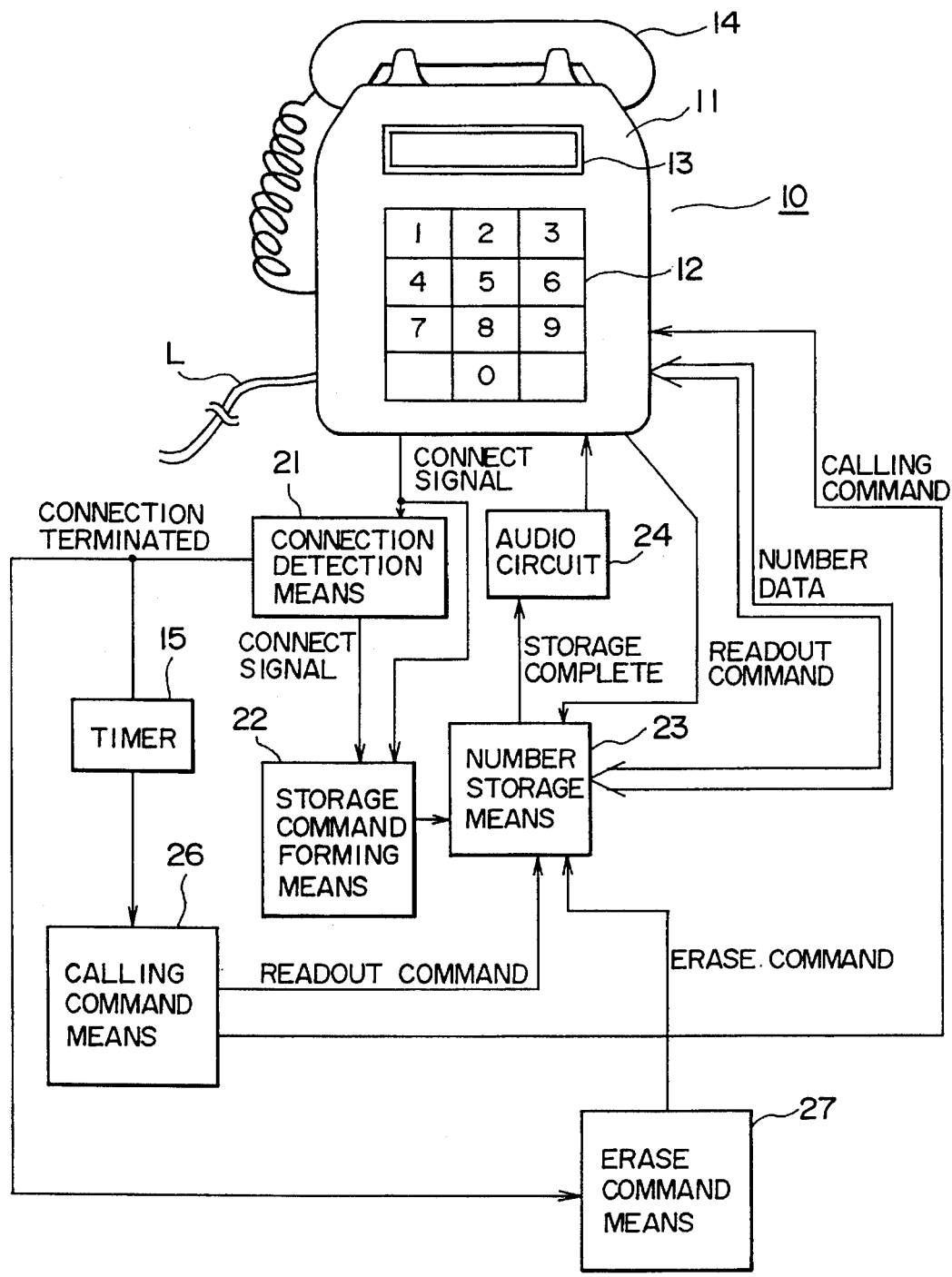
FIG. 1 is an explanatory drawing of the configuration of one embodiment of the present invention used as an automatic dialing device.

FIG. 1 is an explanatory drawing of the configuration of one embodiment of the present invention. In this drawing, 10 is a subscriber telephone in a communications network of a telephone company, which is connected to the communications network of the telephone company via the line L. Telephone 10 has a main unit 11 which has a ten-key dialing pad 12, a liquid-crystal display 13, and a handset 14 which is connected to it via a cord.

In this embodiment, to add the function of the present invention to such a telephone as is, a connection detection means 21, a storage command forming means 22, a number storage means 23, an audio circuit 24, a timer 25, a calling command means 26, and an erase command means 27 are provided.

By means of this configuration, when the connection detection means 21 detects the condition of the telephone as connected, when the transmission instruction signal and the telephone number of the party to be called are sent with the received signal, the storage command forming means 22 detects that this is a telephone number of a party to be called and stores it in the number storage means 23. When the storage has been completed, the number storage means 23 issues a storage completion signal to the audio circuit 24, and the output of the audio circuit 24 notifies the other party via the telephone 10 that the transfer has been successfully made. The number storage means 23 is configured so as to be able to store at least one, and preferably a number of, telephone numbers of approximately 10 digits for domestic calls and 10 or so digits for overseas calls. When the connection detection means 21 detects that the telephone connection has been terminated, in addition to the calling command means 26 issuing a calling command to the telephone 10, a readout command is issued to the number storage means 23 to apply the stored number data to telephone 10 to cause it to place a call when the connection is completed by means of this call, an erase command is issued by the erase command means 27 in response to the connection completion signal from the connection detection means 21, this causing the stored number in the number storage means 23 to be erased.

If the called party's line is busy, so that connection is not possible on the first call, the busy signal is sensed, and return is made to the wait condition automatically, calling being repeated a number of times every appropriate interval, for example, every one minute, and if it is still not possible to make connection, the number is held as in the number storage means 23, waiting for a calling operation. Thereafter, if a calling operation is made, for example from the ten-key dialing pad 12, the number stored in the number storage means 23 is used to make a calling operation from the telephone 10.

Figure 2:
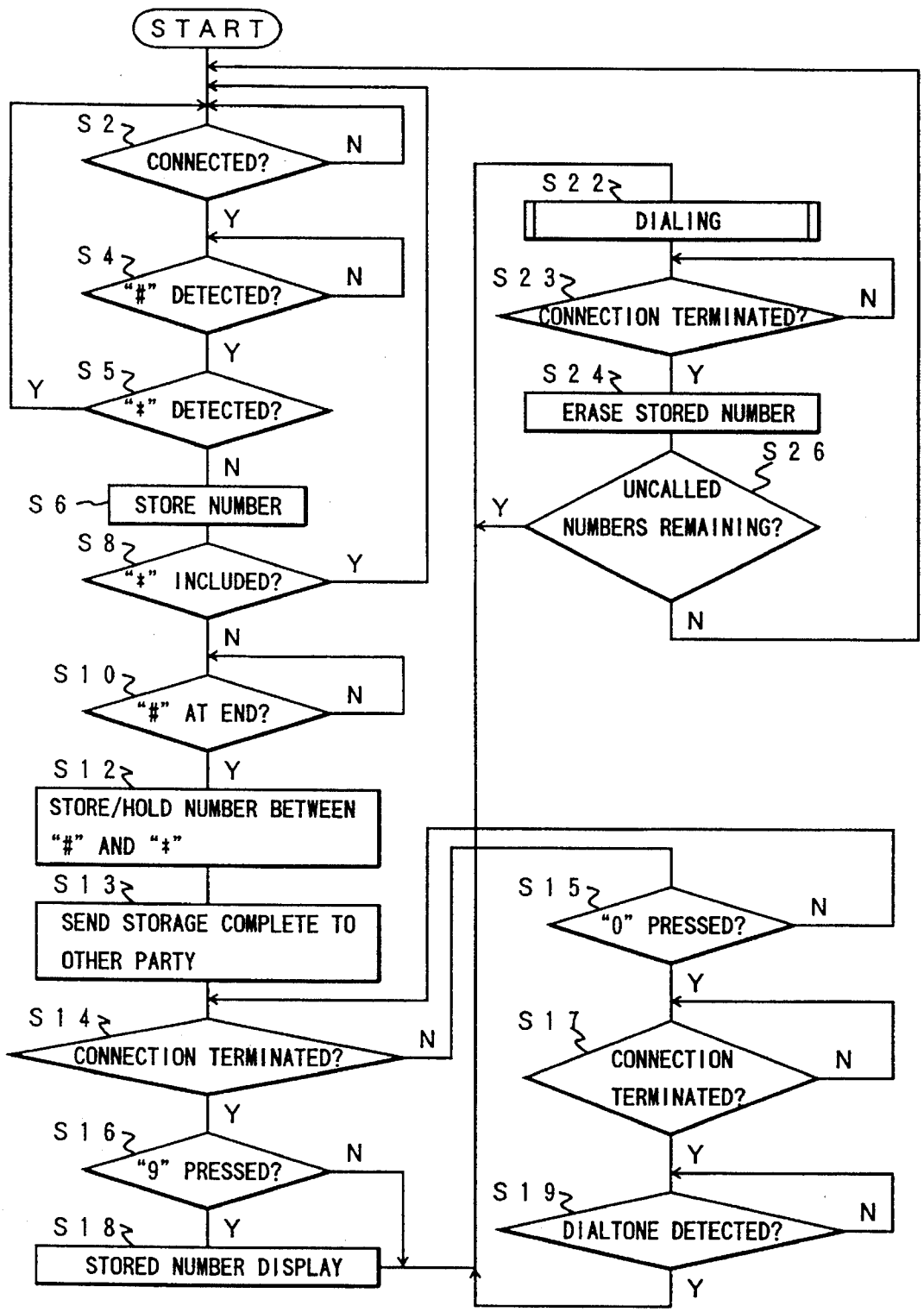
FIG. 2 is a flowchart of the operation of the embodiment shown in FIG. 1.
Figure 3:
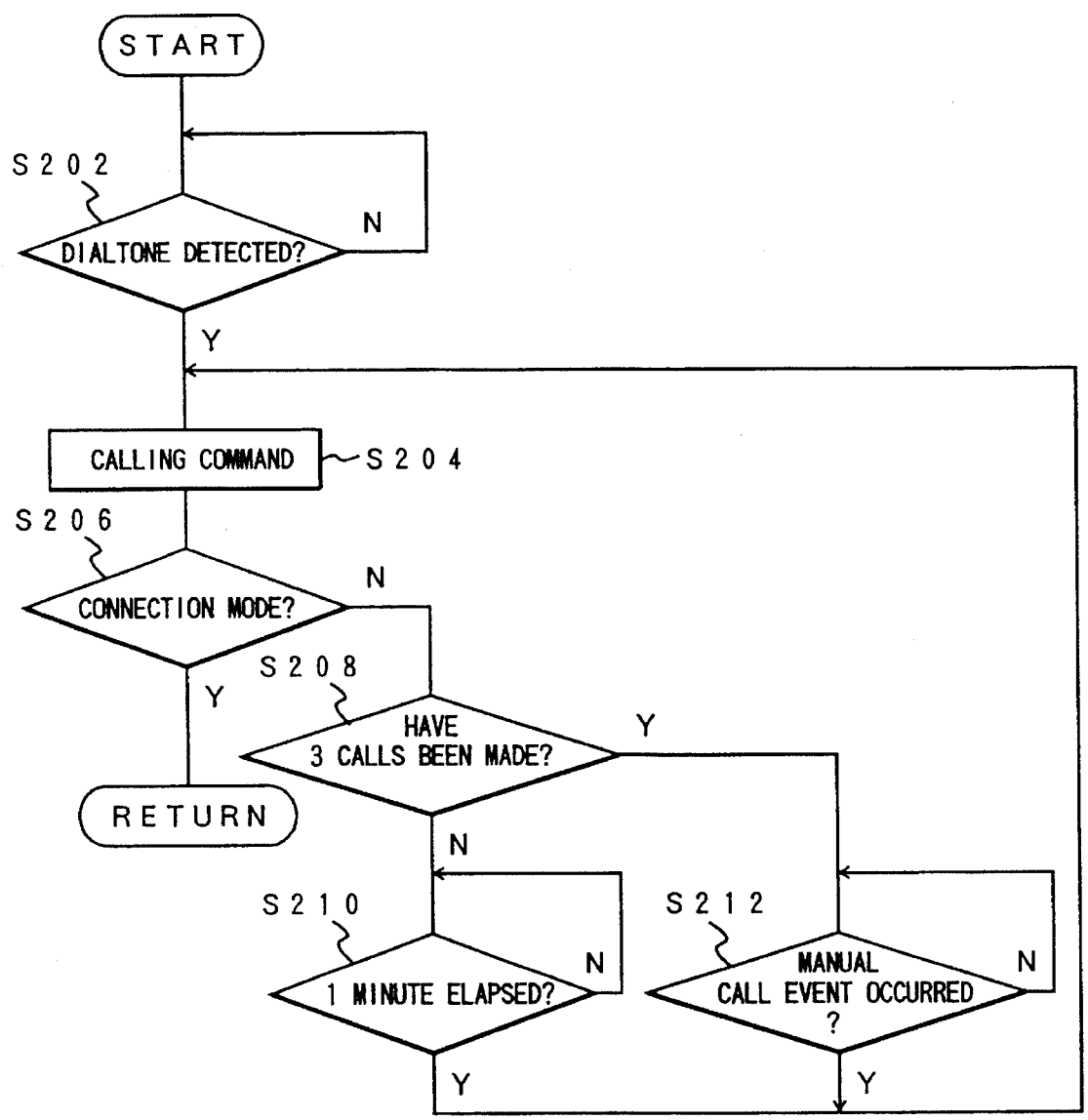
FIG. 3 is the subroutine of the flowchart of FIG. 2.

FIG. 2 and FIG. 3 are a flowchart and subroutine, respectively, of the operation of the configuration which is shown in FIG. 1. These two drawings will now be used to describe the operation of the configuration shown in FIG. 1 in detail.

Assume that a call which should be returned is received at the telephone 10, and that a call is received which includes the telephone number of the other party, that is, the number to be called.

In this case, starting at step S2, the connection detection means 21 detects the connect condition from the connect signal issued from the telephone 10 and applies a detection output to the storage command forming means 22. The storage command forming means 22 monitors the connect signal from the telephone 10, and when it sensing the combination of the transmission instruction signal and the telephone number of the party to be called, it outputs a storage command to the number storage means 23. The fact that this is a telephone number of a party to be called is distinguished, for example, by means of step S4 which determines whether or not the "#" used as a transmission instruction signal is included as a prefix (or suffix, or both) in the telephone number for transfer. Let us assume for a moment that the number of the party to be called is in the form "#xxxxxxxx#" (where each x is simply a numeral), that is, that the telephone number has begins and ends with "#".

When this storage command is issued to the number storage means 23, the numerical data from telephone 10 is stored one character at a time at step S6. If this is the combination of only the telephone number to be called and "#" the number storage means 23 removes the "#" and stores the number part only.

On the other hand, if the telephone number of the other party to be called includes a "*" which means cancel, the number storage is terminated as a result of step S8, and return is made to step S2. This is done because, if "*" was included, it is necessary because of an error in the telephone number of the party to be called, for example, to send the entire number from the start once again.

When the number does not include "*" at step S10 the storage command forming means 22 verifies the presence of the last "#" in the format "#xxxxxxxx#" and this is stored and held in the number storage means 23 at step S12. Once this store and hold operation is done, the number storage means 23 issues a storage completion signal to the audio circuit 24 at step 13, the audio circuit 24 in response to this sending an audible signal via the telephone 10 to the connected party, thereby giving notification of the telephone number of the party to be called.

When this connection, which included a notification of the telephone number of the party to be called, is completed, after a verification at step S14, the flow proceeds to step S16. At step S16, the stored and held telephone number of the party to be called is read out and displayed, providing a verification of the fact that the telephone number of the party to be called was stored and of what the stored number was. To do this, "9" for example is pressed on the ten-key dialing pad 12. By doing this, the telephone number of the party to be called which is stored in the number storage means 23 is issued to both the liquid-crystal display 13 and the handset 14, this being both visibly displayed as numerals and audibly indicated by a tone.

When the telephone number of the party to be called is not only stored and held in the number storage means 23 but also displayed by means of step S18, automatic dialing is performed at step S22 according to a timer. If the automatic dialing does not succeed in making a connection, the device waits for a calling operation to make the call.

If at step S14 a determination is made that the connection has not been terminated, a check is made at step S15 of whether or not "0" has been pressed. This pressing of "0" would have been done if the user wished to perform automatic dialing again after the connection was terminated, by picking up the handset. If "0" had been pressed, a check is made at step S17 of whether the connection is terminated, and a check is made of whether or not the handset has been picked up again and a dialtone is being received from the line, after which flow proceeds to step S22 at which dialing is performed.

This calling operation is shown in FIG. 3. Specifically, what happens is that a check is made at step S202 as to whether or not a dialtone has been detected and also as to whether a prescribed amount of time, for example 0.5 to 2.0 seconds, has elapsed from the termination of the connection. If this time in seconds had already elapsed, the flow proceeds to step S204, a signal is issued from the timer 25 to the calling command means 26, and a calling command issued to the telephone 10 from the calling command means 26. This causes the telephone 10 to call the number that is stored in the number storage means 23.

If a connection is made as a result, flow proceeds from step S206 to the END, that is, to step S23. If, however, a connection was not achieved, flow proceeds to step S208. At step S208, a check is made as to whether or not three calls have been made already, and if not, the flow returns by means of step S210 to step S204 to performing calling every one minute. If even this fails to achieve a connection, after passing through steps S206 and S208, flow proceeds to step S212, thereby waiting for a manual calling operation. This calling operation can be performed, for example, by simply pressing "#" on the ten-key dialing pad, followed by a combination of numerals such as "1, 2, . . . " to read out a plurality of stored numbers as desired.

If this type calling operation results in a connection, flow proceeds to step S23, where a check is made by the connection detection means 21 of whether or not the connection has been terminated. The termination of the connection is normally established by resting the handset 14 on the main unit 11 of the telephone 14 to create the on-hook condition. If the connection has been terminated, the number which had been stored in the number storage means 23 is erased at step S24.

Next, at step S26 at check is made as to whether or not there is a number stored and held in the number storage means 23 which has not yet been called. If there is, flow proceeds to step S22, from which the above-described calling operation is performed.

While in the above-noted embodiment the telephone number of the party to be called was in the format "#xxxxxxxx#", this can be changed to a variety of different formats. For example, it is possible to affix either one or two or more "#" characters to just either the beginning or the end of "xxxxxxxx" and it is also possible to use "*" in place of "#". Furthermore, it is possible to provide this by the addition of a different button to the telephone 10.

In addition, while in the above-noted embodiment the telephone number of the party to be called is obtained by means of a operation of a ten-key dialing pad at the party to whom connection is made, it is also possible to obtain this from tone signals from, for example, a directory assistance service, this being stored and used in performing calling. Furthermore, it is also possible to store the telephone number of the party to be called by pressing a key such as "#" and numeric keys on a ten-key dialing pad based on the voice from this directory assistance service.

Figure 4:
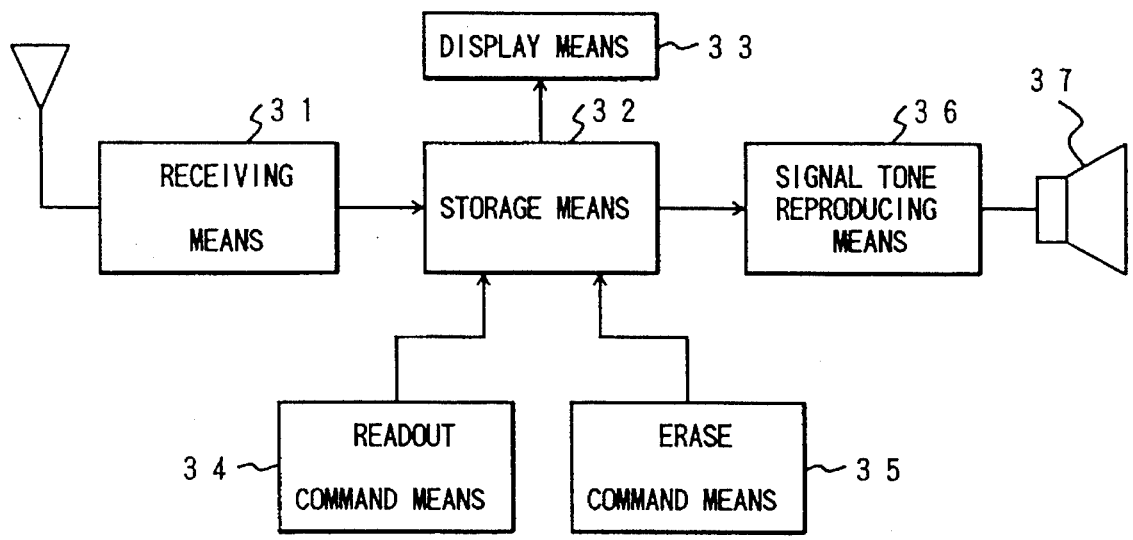
FIG. 4 is a block diagram which shows the configuration of an embodiment of the present invention used as a pocket radio pager.

FIG. 4 is a block diagram which shows the configuration of an embodiment of the present invention for use as a pocket radio pager. This embodiment has a receiving means 31 which receives a signal which is sent by radio waves and includes the telephone number data, and various means which perform an auxiliary dialing operation of the telephone based on the signal received by the receiving means 31. These various means are a storage means 32 which stores telephone number data from the receiving means 31, a display means 33 which displays the telephone number data stored in the storage means 32, a readout command means 34, a signal tone reproduction means 36 which forms an audible signal based on the telephone number data output from the storage means 32 when a command is issued from the readout command means 34, a speaker 37 which outputs the audible signal given by the signal tone reproduction means 36, and an erase command means 35 which erases the data stored in the storage means 32.

Figure 5:
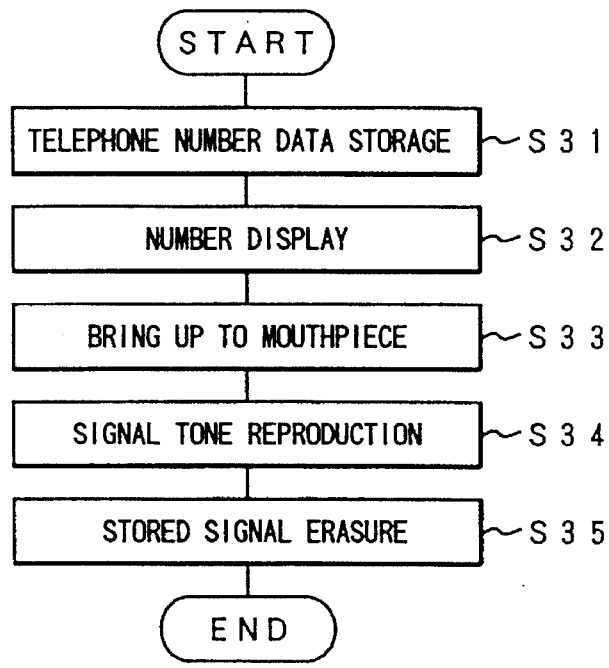
FIG. 5 is an explanatory drawing of the operational details of the embodiment shown in FIG. 4.

FIG. 5 is a flowchart which shows the detailed operation of the embodiment which is shown in FIG. 4. In this embodiment, the receiving means 31 receives telephone number data sent by radio waves, which is then stored in the storage means 32 and displayed as a telephone number by display means 33. In addition, the received telephone number data is used in performing a dialing operation from the telephone by means of the signal tones output from the speaker 37 by means of the signal tone reproduction means 36 which reproduces the tones by using the received telephone number data. When manual operations are performed, the data stored in the storage means 32 is read out and erased in accordance with commands generated by the readout command means 34 and erase command means 35, respectively.

That is, when telephone number data is received by radio waves, the telephone number data is stored by means of step S31, and is visibly displayed by means of step S32, thereby giving notification of the transmitted telephone number to the holder of the pocket radio pager. Subsequently, at step S33 the pocket radio pager is set onto the mouthpiece, and when the signal tones are caused to be reproduced at step S34, the reproduced tones are sent into the telephone via the mouthpiece of the telephone, these causing the dialing operation. When the dialing operation is completed, step S35 erases the telephone number data which had been stored.

Effect of the Invention

By means of the present configuration of claim 1, when a telephone connection is made, by storing a telephone number to be called when a transmission instruction signal is sent together with the telephone number of the party to be called, it is possible to dial the number with no need to make any particular note of the telephone number. By doing this, once the connection is made the telephone number stored in the number storage means is erased, and the condition of waiting for the next such storage of a telephone number is enabled. After calling a prescribed number of times, the telephone number is held in the number storage means for use in a manual calling operation.

By means of the configuration of claim 2, it is possible for the number storage means to consecutively store a plurality of telephone numbers, and to perform the operation of reading these out consecutively.

By means of the configuration of claim 3, in response to a manual operation input, number data is output, this number data being used to generate a sound from the handset of the telephone, providing a verification of the data by means of the type of sound.

By means of the configuration of claim 4, when the storage of the telephone number that is to be called is completed, it is possible to reliably verify from the other party that the number was stored.

By means of the configuration of claim 5, telephone number data sent as a radio signal is received by a pocket radio pager and stored, because it is possible to perform a dialing operation based on this stored number, the operation of dialing is simplified.

By means of the configuration of claim 6, as long as an erase operation is not performed, it is possible to read out the telephone number data for use in dialing.

What is claimed is:

1. An automatic dialing device for a telephone which has a connect condition upon receipt of a telephone call, said automatic dialing device comprising:

a connection detection means for detecting the telephone connect condition;

a storage command forming means for forming a telephone number storage command for a received telephone number of a party to be called when said connection detection means detects the connect condition;

a number storage means for storing the telephone number received along with a transmission instruction signal when a number storage command is given from said storage command forming means;

a calling command means for forming a calling operation to a remote party at least one time using said telephone number stored in said number storage means after the detection of the end of telephone connection by said connection detection means; and an erasure means which erases the contents of memory in said number storage means after the connect condition occurs by means of a calling operation by said calling command means.

2. An automatic dialing device for a telephone according to claim 1, wherein said number storage means stores and reads out a number of telephone numbers consecutively.

3. An automatic dialing device according to claim 1, wherein said number storage means reads out number data in response to a manual operating input, said number data causing a sound to be emanated from a handset of the telephone.

4. An automatic dialing device according to claim 1, which additionally comprises an audio circuit for forming an audible signal, said audio circuit forming said audible signal in response to a storage completion signal generated at the completion of the storage by said number storage means of said number of the remote party to be called, and being transmitted to said remote party via said telephone.

* * * * *